Oct. 28, 1924.
A. B. CROSIER ET AL
TALKING MACHINE
Filed March 24, 1922    5 Sheets-Sheet 1
1,513,725
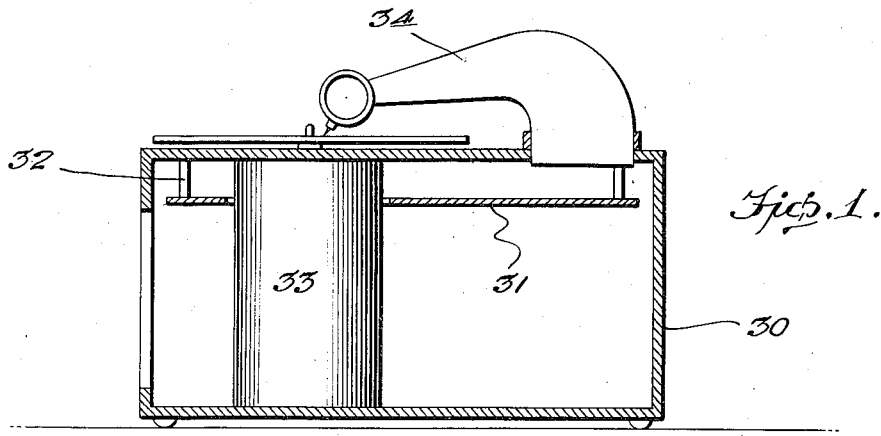
Fig. 1.
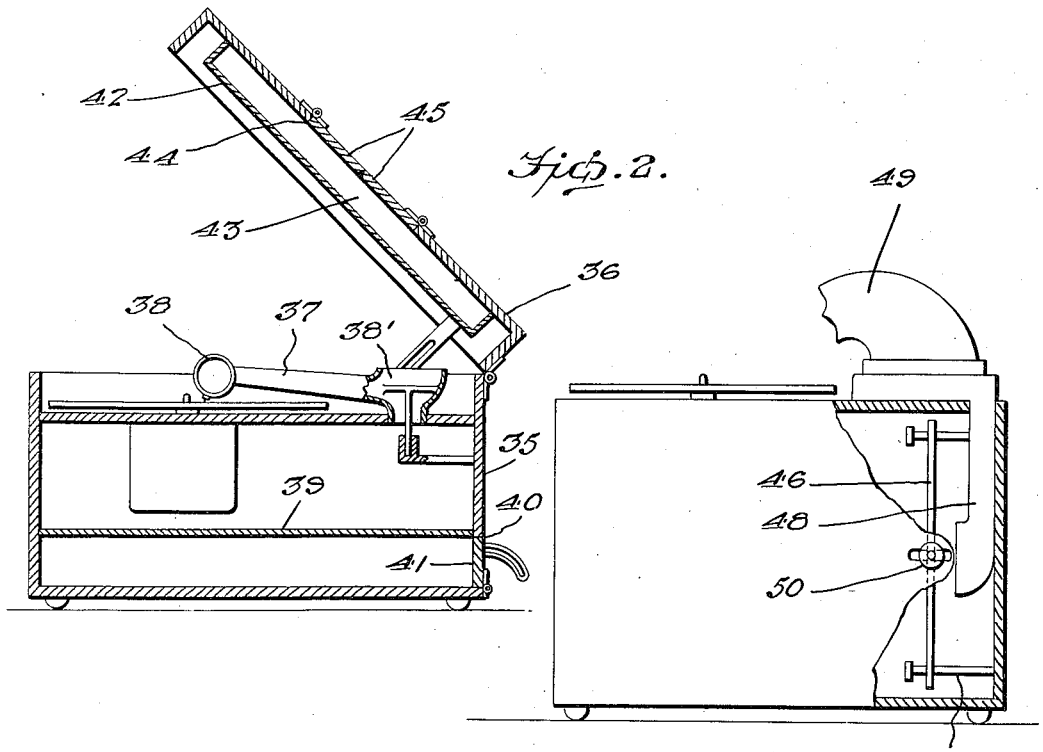
Fig. 2.
Fig. 3.
Inventors
A. B. Crosier
F. B. Crosier
Victor J. Evans
Atty.

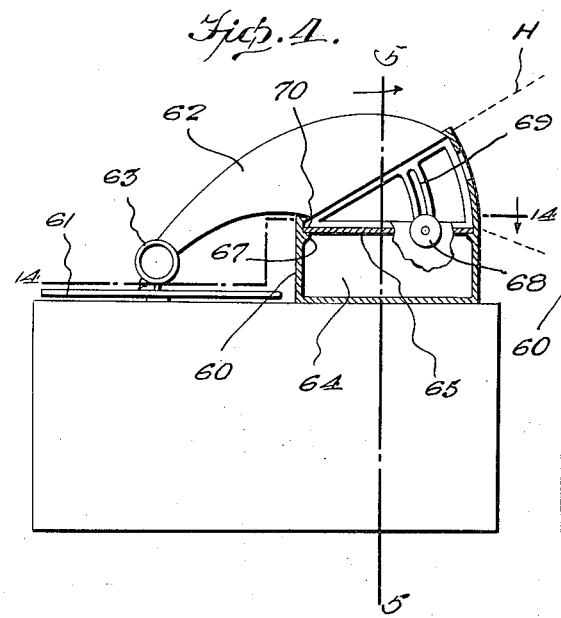
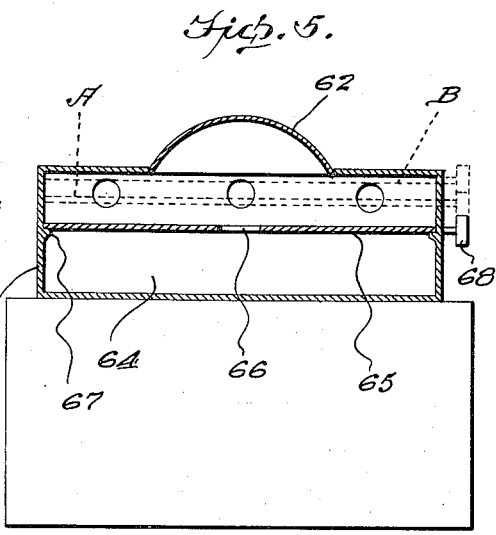
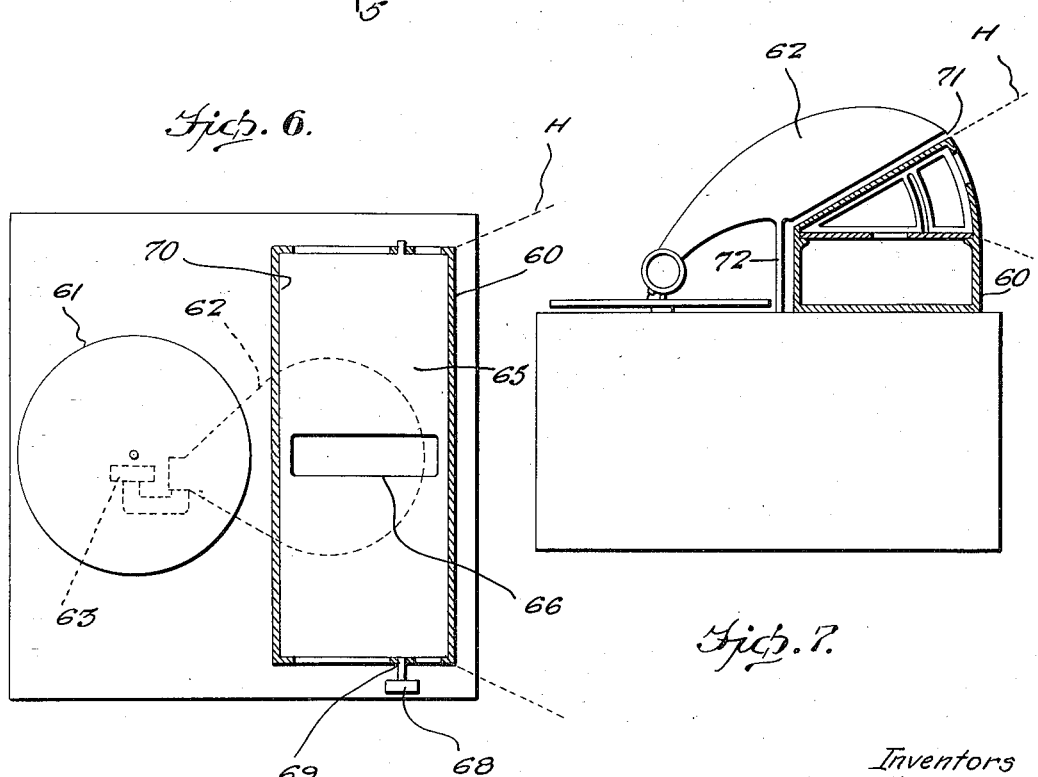

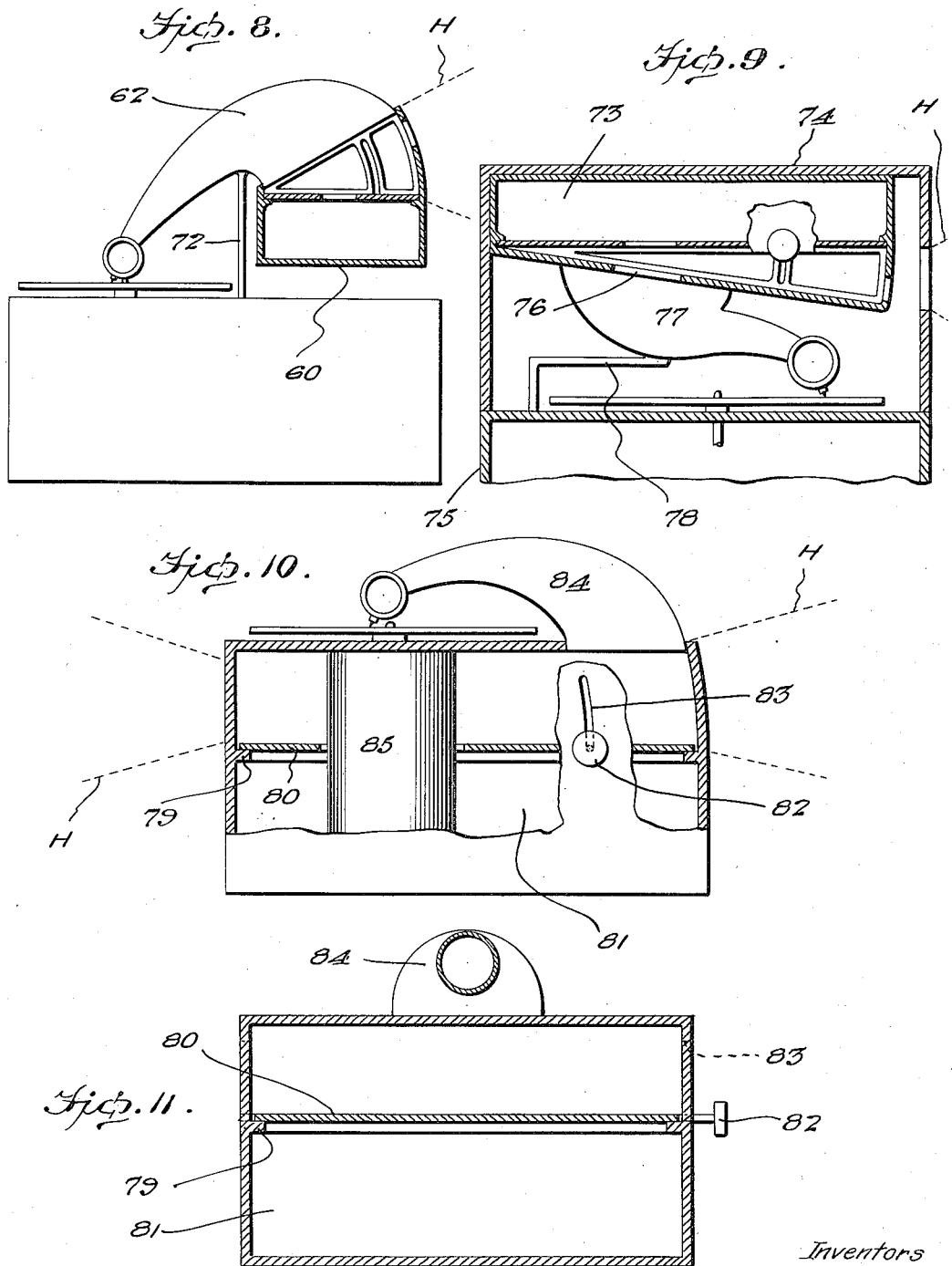

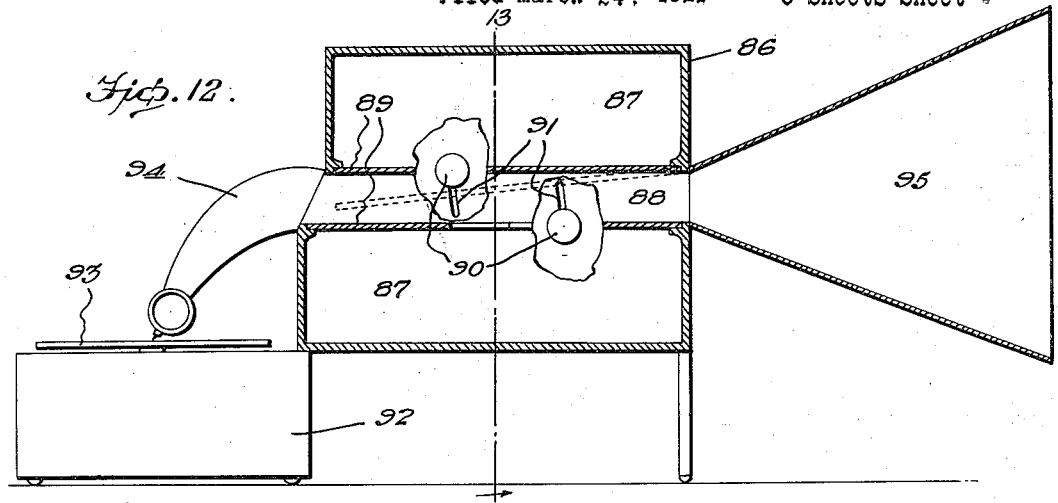
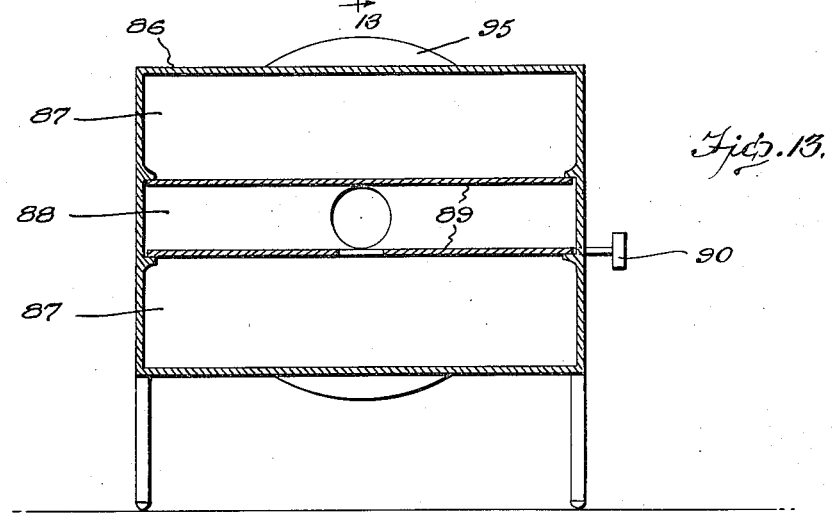
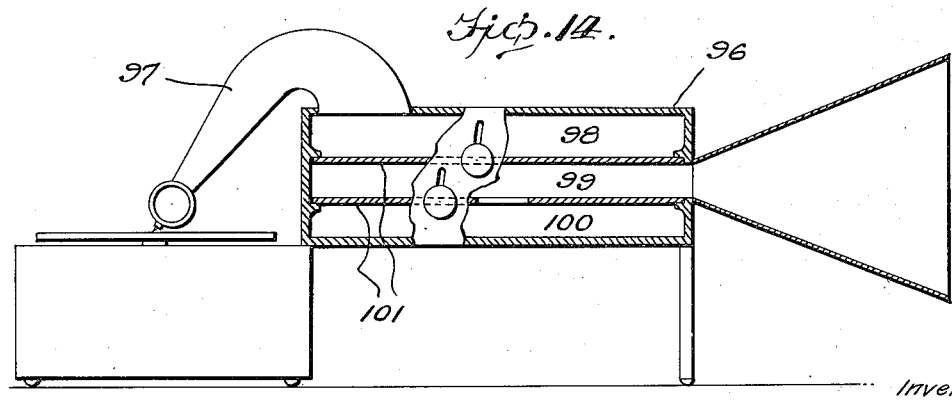

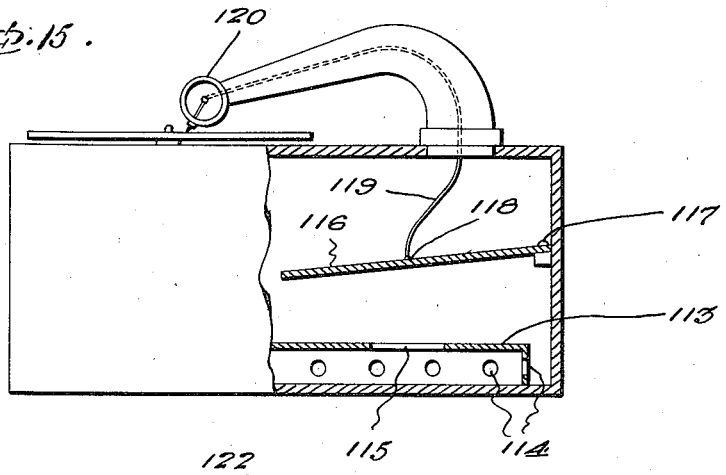
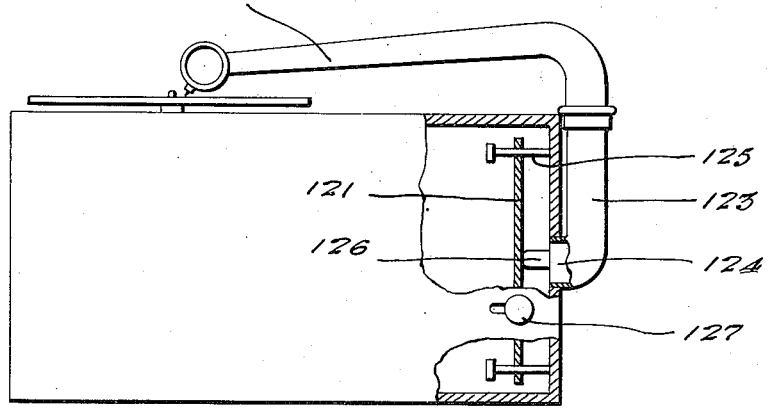
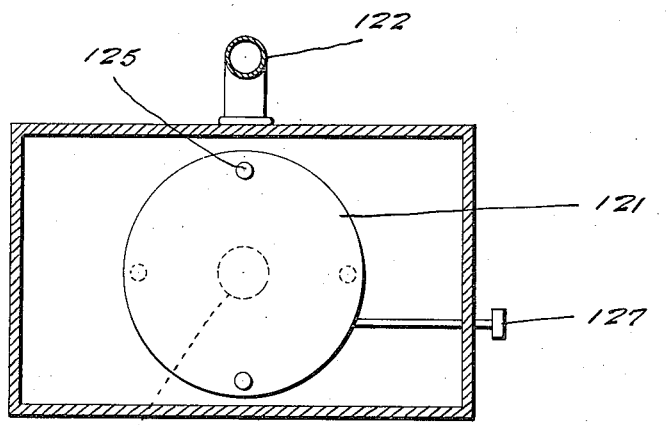

Patented Oct. 28, 1924.

1,513,725

UNITED STATES PATENT OFFICE.

ARTHUR B. CROSIER AND FRANK B. CROSIER, OF BELOIT, WISCONSIN.

TALKING MACHINE.

Application filed March 24, 1922. Serial No. 546,355.

*To all whom it may concern:*

Be it known that we, ARTHUR B. and FRANK B. CROSIER, citizens of the United States, residing at Beloit, in the county of Rock and State of Wisconsin, have invented new and useful Improvements in Talking Machines, of which the following is a specification.

This invention relates to improvements in phonographs or sound machines and has for an object the provision of a sound producing or reproducing machine, wherein sound waves set in motion by a producing or reproducing instrument, are amplified and their tonal qualities improved, so as to more truly reproduce and multiply the sounds of various instruments and voices, increase the acoustic qualities of the instrument and distribute the sounds over a considerable area.

Another object of the invention is the provision of an instrument of the above character, in which the sound waves set in motion by the reproducing or recording instrument are directed to an air chamber, wherein the air is set in motion and action communicated to an adjustable or stationary diaphragm or resonator whose action causes the surrounding air to vibrate in unison therewith and thus increase and improve the tonal qualities and acoustic action of the instrument.

To this end, the invention contemplates means for augmenting or increasing sound waves by the use of a prepared, suitably constructed supplemental or suitably constructed auxiliary diaphragm or resonator, which is capable of adjustment and high vibration and altering the character and properties of sound waves and which receives the sound waves from the usual instrument carried by the tone arm and evenly distributes these waves over a large area, instead of sending them forth in the usual restricted manner, so that the sound reproduced by the instrument is substantially the same in all directions. Thus, sound waves striking the diaphragm or resonator of suitable material and structure and shape, are remade or re-used and all of the benefits of the sound board obtained, such as increased beauty of tone, tone delineation, resonance, quality and sweetness.

Another object of the invention is the provision of a machine of this character in which the form of sound betterment and distribution may also be utilized in recording instruments, the adjustable or stationary supplemental or auxiliary diaphragm being acted upon by sounds to be recorded and transferred to the recording instrument.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view taken through one form of the invention.

Figure 2 is a vertical sectional view of a modified form of the invention.

Figure 3 is a vertical sectional view illustrating another form of the invention.

Figure 4 is a vertical sectional view illustrating a different arrangement of sound box and diaphragm, together with means for regulating the same.

Figure 5 is a vertical section on the line 5—5 of Figure 4.

Figure 6 is a horizontal section on the line 6—6 of Figure 4.

Figure 7 is a vertical sectional view illustrating a form of the invention in which the tone arm is slightly separated from the sound box.

Figure 8 is a view similar to Figure 7 but illustrating the tone arm supporting the sound box.

Figure 9 is a sectional view illustrating the sound box mounted upon the lid or cover of a phonograph cabinet.

Figures 10 and 11 are sectional views taken at right angles to one another and showing a more compact form of instrument.

Figure 12 is a vertical sectional view illustrating a double arrangement of dead air chambers.

Figure 13 is a section on the line 13—13 of Figure 12.

Figure 14 is a vertical sectional view showing a different arrangement of dead air chambers.

Figure 15 is a side elevation partly broken away showing another form of the invention.

Figures 16 and 17 are respectively longitudinal and transverse sections of another form of the invention.

Broadly stated, the invention comprises means for augmenting or increasing sound ume and tone quality and acoustic properties of a sound reproducing and recording machine and better acoustic advantages and while the principle is the same, the invention can be carried out in various ways. For the purpose of explanation, several different forms of the invention are shown and described, but it is to be understood that the invention is not limited to the specific forms shown. As an example, in Figure 1, the form of the invention shown discloses a cabinet 30 forming an air chamber, while the sound board 31 is supported from beneath as indicated at 32. In this form of the invention the motor and other operating mechanism is enclosed within a cylindrical casing 33 which passes through an opening provided in the sound board 31 so as to provide for the rotation of the turn table. The tone arm 34 has one end extending downward within the air chamber in juxtaposition to the sound board 31, so that the sound waves act thereon.

In Figure 2, the machine is shown as including a cabinet 35, having a hinged lid or cover 36. In this form of the invention, the tone arm 37 is provided at one end with a reproducer 38 and at its opposite end with a transverse passage 38'. The air chamber is formed within the cabinet 35 and located within this chamber is a sound board 39, which is acted upon by the sound waves passing downward through the passage 38' and the augmented waves escaping through an opening 40 formed in the cabinet. This opening may be regulated by an adjustable door or closure 41 so as to regulate the volume of sound. In addition, the lid or cover 36 of the cabinet is provided with a sounding member 42 which is secured to and spaced from the said lid or cover so as to provide an air space 43 between the board and cover. The sound waves passing forward from the passage 38' act upon the sound member 42, as will be readily apparent. If desired, the lid or cover 36 may be provided with an opening 44 for the escape of the sound waves and this opening may be closed by doors 45.

In the form of the invention illustrated in Figure 3, the sound board or resonator is indicated at 46. In this form the sound board or resonator is vertically supported as indicated at 47 and is arranged in juxtaposition to the inner open end of a vertically arranged passage 48, whose upper end is in communication with the inner end of the tone arm 49. The sound board or resonator 46 is adjustable relatively to the open end of the passage 48, by means of a handle 50, so as to regulate its action.

In Figures 4, 5 and 6, the amplifier which is indicated at 60 is mounted upon the cabinet of the machine and to one side of the turn table 61. The tone arm 62 extends from the top of the amplifier 60 and carries at its outer end the usual recorder or reproducer 63.

With this form of the invention, the space within the sound box 60 provides an air chamber 64 which is horizontally divided by means of a sound board 65 having an opening 66 therein. This sound board 65 rests upon a supporting ledge 67 and is adjustable with respect to the inner end of the tone arm 62. This adjustment is effected by means of a handle 68 which extends through an arcuate slot 69 provided in one wall of the amplifier 60, so that the sound board 65 may be moved upon one edge 70 as a fulcrum. The sound board 65 which is acted upon by sound waves in the arm 62 provides a resonator so as to set up agitation within the dead air chamber 64 after the manner previously described. When the sound board is in the full line position shown it provides a resonator which increases and multiplies the sound waves set in motion by the instrument 63. When in the position shown at B, it is arranged in close proximity to the inner end of the tone arm 62 and acts in the capacity of a resonator.

In Figure 7, the construction and operation is substantially the same as that described in the preceding figures, except, in this form of the invention the inner end of the tone arm 62 is spaced from the adjacent wall of the amplifier 60 so as to provide a space 71. This permits of the entrance of air between the inner end of the tone arm 62 and the adjacent wall of the amplifier and provides means whereby the sound waves passing from the amplifier 60 may be evenly and widely distributed over a large area. The tone arm 62 is supported by a bracket 72 carried by the cabinet, so that there is no contact between the said arm and the sound box 60.

In Figure 8, the tone arm 62 is supported in the same manner as in the preceding figures, but the sound box 60 is secured to the end of the tone arm and is supported thereby. In this form of the invention and also in Figures 4 and 7, the position of the horn when the instrument is used for recording is indicated by the dotted lines H.

In Figure 9, the amplifier 73 is supported within a lid or cover 74 of a cabinet 75. This sound box is provided with an opening 76 and the inner end of the tone arm 77 is arranged to cover the said opening so that the sound waves are directed into the amplifier, where the construction and action is the same as that described in Figures 4 to 8 inclusive. The tone arm 77 is supported upon a bracket 78 and remains substantially in the position shown, while the amplifier is elevated with the raising of the lid or cover 74. When used for recording, this form of the invention has the recording horn H secured in the position shown by the dotted lines.

In Figures 10 and 11, the amplifier is combined with the cabinet and is provided with a rib or shoulder 79 which supports the sound board 80 so that the space beneath this sound board provides an air chamber 81. The sound board is adjustable by means of a handle 82 which operates through a slot 83, and the tone arm 84 has its inner end arranged over an opening provided in the top of the cabinet. In this form of the invention the motor may be contained within a cylindrical casing 85 which extends downwardly through an opening provided in the sound board 80 and is supported upon the bottom of the casing. The position of the recording horn is indicated by the dotted lines at H.

In Figures 12 and 13, the amplifier which is indicated at 86 is divided into separate air chambers 87, which are divided by a central passage 88. The walls of this passage are defined by spaced sound boards 89, which are capable of adjustment as shown by the dotted lines so as to regulate the sound, handles 90 which operate through slots 91, being provided for this purpose. The amplifier 86 is supported upon a cabinet 92 and has the turn table 93 arranged at one side thereof. The tone arm 94 extends from one end of the passage 88, while the opposite end of the said passage may have extending therefrom a horn 95.

In Figure 14, the amplifier 96 has the tone arm 97 extending from the top thereof and is divided into compartments 98 and 99 and 100, by means of sound boards 101, which are adjustably supported in a manner similar to those previously described.

In Figure 15, the amplifier which is indicated at 113 is arranged within the bottom of the cabinet and is provided around its sides with spaced openings 114 and in its top with a relatively large opening 115. Located above the opening 115 is a diaphragm or resonator 116 which is secured to one of the walls of the cabinet along one edge of the said diaphragm in a manner to permit of limited movement, as indicated at 117. Secured to the diaphragm 116 as shown at 118, is one end of a flexible member, for example, a wire 119. The opposite end of this wire is secured to the usual diaphragm within the recorder or reproducer 120 and to permit of this the flexible member 119 extends through the tone arm as indicated by dotted lines.

In Figures 16 and 17, the form of the invention shown is somewhat similar to that shown in Figure 3 in that the diaphragm or resonator is vertically arranged within one end of the cabinet as shown at 121. The tone arm 122 has its inner end connected over one end of a hollow cylindrical member 123 arranged upon the outside of the cabinet and forming a tone passage whose inner end communicates with an opening 124 arranged substantially central behind the resonator 121. The diaphragm or resonator 121 is supported as shown at 125 and rests against pins or studs 126. Like the form of the invention shown in Figure 3, the diaphragm or resonator may be adjusted relatively to the opening 124 by means of a handle 127. It is of course obvious that the member 123 may be arranged within the cabinet if desired, the purpose being to direct the sound waves passing from the tone arm, upon the diaphragm or resonator for the purpose previously explained.

It will be apparent from the foregoing description and accompanying drawings, that the invention provides a movable sound board, whose arrangement, position and structure may be adapted to various conditions, the purpose being to provide means whereby sound waves may be reutilized or made over so as to increase their volume and improve their tonal and acoustic qualities. While the invention is illustrated in connection with phonographs, it also may be utilized in connection with other types of sound reproducing machines, such as a dictaphone, amplifier and the like.

The invention is susceptible of various changes in its form, proportions and minor details of construction and the right is herein reserved to make such changes as properly fall within the scope of the appended claims.

Having described the invention what is claimed is:—

1. The combination with a sound reproducing and recording machine, of a resonance chamber located at the inner end of the tone arm.

2. The combination with a sound reproducing and recording machine, of a resonance chamber located at the inner end of the tone arm and an auxiliary diaphragm positioned within the resonance chamber in juxtaposition to said inner end.

3. The combination with a sound reproducing and recording machine, of a tone arm, a sound box located at one end thereof and an air chamber constituting a resonance medium located at the opposite end of the tone arm.

4. The combination with a sound reproducing and recording machine of a tone arm, a sound box at one end thereof, a sound box also located at the opposite end of the tone arm and defining an air chamber and a diaphragm located within the dead air chamber in juxtaposition to the tone arm, and means to vary the size of the air chamber.

5. A sound recording and reproducing machine embodying a casing, a tone arm, a sound box located at one end thereof, an air chamber located at the opposite end of the tone arm and constituting a resonance medium and a vibratory member adapted to be acted upon by the air within the chamber.

6. A sound recording and reproducing machine embodying a casing, a tone arm, a sound box located at one end thereof, an air chamber arranged at the opposite end of the tone arm and means whereby the size of the air chamber may be regulated, said means including a vibratory member adapted to be acted upon by the air within the air chamber.

7. A sound recording and reproducing machine, of a tone arm, a sound box at one end thereof, a resonance chamber located at the opposite end of the tone arm and defining an air chamber and a diaphragm adjustably mounted within the air chamber.

In testimony whereof we affix our signatures.

ARTHUR B. CROSIER.
FRANK B. CROSIER.